UNITED STATES PATENT OFFICE.

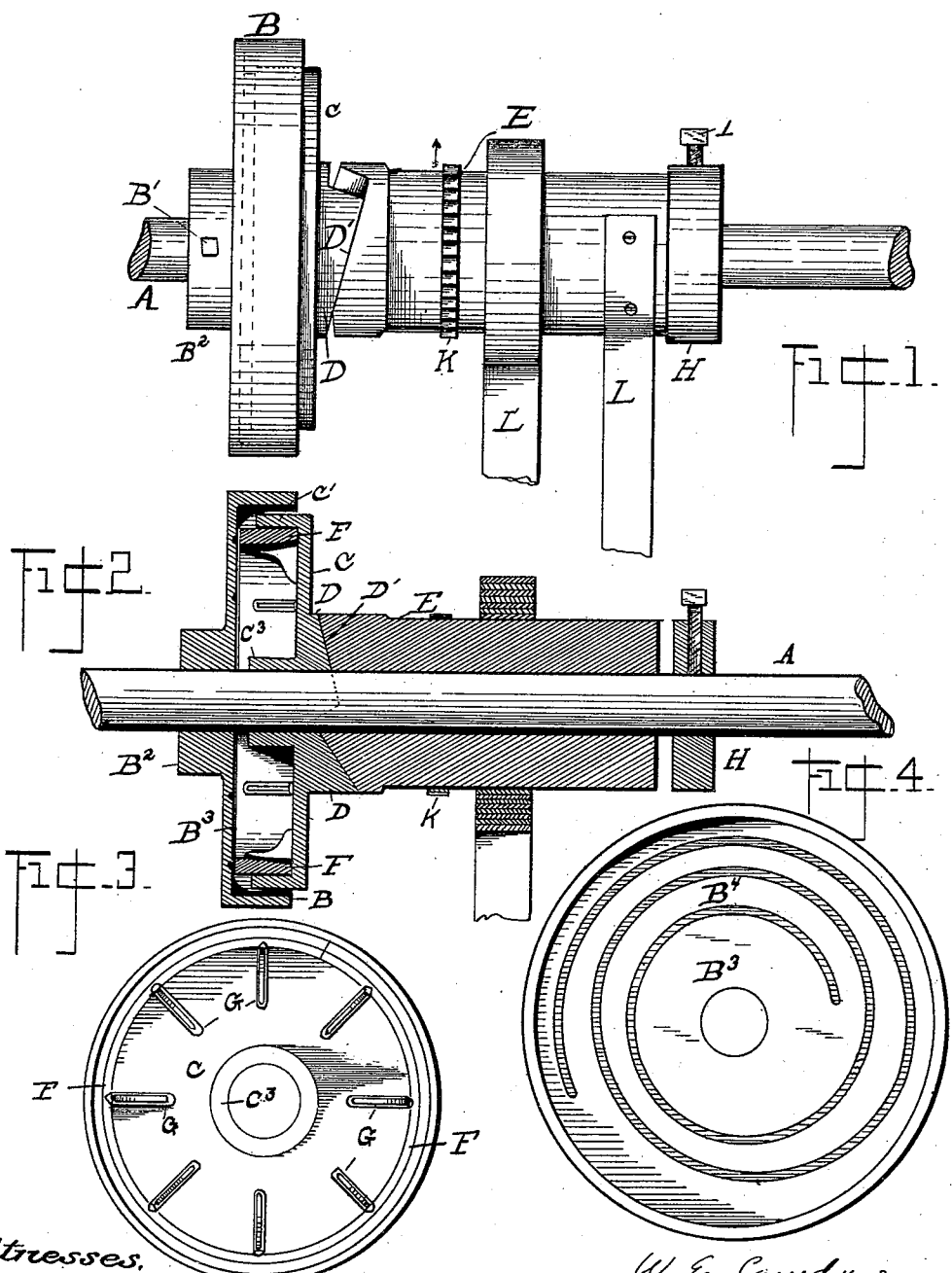

WILLIAM E. CANEDY, OF DOWNER'S GROVE, ILLINOIS.

FRICTION-CLUTCH.

SPECIFICATION forming part of Letters Patent No. 464,492, dated December 8, 1891.

Application filed May 25, 1891. Serial No. 393,994. (No model.)

*To all whom it may concern:*

Be it known that I, WILLIAM E. CANEDY, residing at Downer's Grove, in the county of Du Page and State of Illinois, have invented certain new and useful Improvements in Friction-Clutches, of which the following is a specification, reference being had therein to accompanying drawings.

This invention relates to clutch-gear of the character generally known as "friction-clutches," and specially useful as a driving-clutch gear.

The object of the invention is to produce a clutch to which the driving power may be transmitted to the driven part by frictional contact, and which may, if desired, also act as a position-driver, and in which the frictional driving-piece may be capable of easy replacement.

Figure 1 is a side elevation. Fig. 2 is a longitudinal section of the entire device. Fig. 3 is a face view of one pulley. Fig. 4 is a face view of the other pulley.

A indicates the driving-shaft, to which the clutch member or driving-pulley B is permanently attached, as by a key or set-screw B', passing through the hub B² and engaging the shaft A, or in other usual manner. Pulley B is preferably cupped to exclude dust, &c., and its inner face B³ is the frictional surface against which the frictional piece F engages. This face B³ has preferably a spiral groove or thread B⁴.

C is a cup-pulley mounted loosely on shaft A and free to turn and to shift lengthwise thereon, the shaft passing through hub C³ of this pulley. The face of pulley C next to pulley A has a cup-shaped rim C', and pulley C is of such diameter that its rim will easily enter the cup of pulley B when pulley B is a cup-pulley.

The inside of the cup-pulley C has a number of lugs G projecting from the disk-face of the pulley or bottom of the cup near the rim C' of said pulley and equidistant therefrom. The lugs G preferably have sharpened or biting faces toward the rim C' and taper a little from top to bottom, so as to leave a little wider space between said lugs at their outer ends than at the bases where the lugs are attached to the disk of the pulley C. The rim C' may also be a little thinner at its outer edge than at its plane of connection to the disk of the pulley.

The entire pulley C, with its rim, hub, disk, and lugs, is preferably a single casting and may be easily trued up in a lathe. The friction-piece is a leather ring F. This ring may be made from a straight strip of leather, or a number of strips, or a single annulus; but I prefer the strips as being more economical. The leather ring, whether of one or several pieces, is of such diameter and width as to tightly fit the space between the rim C' and the lugs G of the pulley C. As this space decreases in width toward the disk of pulley C the leather ring will be wedged between the lugs and the rim and the lugs will embed themselves in the material of the leather, thus holding the ring F tightly to the pulley C. The face of ring F, which is toward the disk B³, is brought into frictional contact with the face B³ of pulley B, on which the spiral thread B⁴ is cut when the pulley B is to be driven from pulley C, and, as will appear, the greater the pressure between the disks of the two pulleys the more tightly will the leather ring be held between the lugs G and the rim C' of pulley C. The leather ring coming in contact with the spiral groove B⁴ will take a firm hold thereon.

The pulley C has cam projections D extending from its rear face. These projections D are in position to engage similar cam projections D' on the end of sleeve E, which sleeve E is mounted on the shaft A, and may both turn and slide lengthwise thereon. The sleeve E is driven by any usual form of driving-gear, as by a ratchet or cog-gear K, or, as I prefer, by a strap connection, as L L', extending to any suitable treadle or other prime mover. When the sleeve E is caused to rotate in the direction of the arrow, (as by the strap L' about the sleeve winding up strap L at the same time,) the cam-surfaces D D' will cause the sleeve E to shift lengthwise of the shaft A. A collar H is firmly secured to the shaft, as by set-screw I, and at such distances from pulley B that the sleeve E and pulley C may easily turn on the shaft between the fixed pulley and ring if the cam-surfaces D lie in the spaces between cam-surfaces D';

but when the cam projections D' are rotated so as to bear against the projections D, then the pulley C will be shifted lengthwise of the shaft and its friction-face F will be held firmly against the face B³ of pulley B. It will be seen that the inclines of the cam-faces may be such as to cause a very firm engagement between the friction-surfaces.

The leather bearing on the spiral groove in the face of the pulley B gives an excellent holding-surface.

I claim—

1. The frictional clutch having two pulleys on a shaft, one pulley being cupped and closing against the other pulley, the cupped pulley containing a leather ring wedged between the rim of the cup, and lugs projecting from the disk thereof, substantially as described.

2. The frictional clutch consisting, essentially, of a pulley fixed to a shaft, a cup-pulley closing against the same and having a rim, a series of lugs near the rim having inclined faces toward the same, a leather strip wound between the rim and lugs and wedged therebetween, and a cam on the cup-pulley engaging an incline on a sleeve on the shaft, the parts in combination, substantially as described.

3. The combination of the pulley having a disk face and a spiral groove therein, and a second pulley carrying a leather ring in position to engage said grooved face, one of the pulleys being movable toward or away from the other, substantially as described.

In testimony whereof I affix my signature in presence of two witnesses.

WILLIAM E. CANEDY.

Witnesses:
FRED H. AYER,
EFFIE SHULTZ.